United States Patent
Lee et al.

(10) Patent No.: US 8,212,776 B2
(45) Date of Patent: Jul. 3, 2012

(54) OPTICAL FINGER NAVIGATION DEVICE WITH INTEGRATED TACTILE SWITCH

(75) Inventors: Hung Kwang Lee, Penang (MY); Sai Mun Lee, Pengang (MY); Yat Kheng Leong, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 890 days.

(21) Appl. No.: 12/236,286

(22) Filed: Sep. 23, 2008

(65) Prior Publication Data

US 2010/0071967 A1 Mar. 25, 2010

(51) Int. Cl.
*G09G 5/08* (2006.01)
(52) U.S. Cl. ........................................ 345/166; 250/239
(58) Field of Classification Search .................. 345/163, 345/166, 165; 250/239
See application file for complete search history.

(56) References Cited

U.S. PATENT DOCUMENTS

| | | | |
|---|---|---|---|
| 4,833,402 A * | 5/1989 | Boegh-Petersen | 324/755.08 |
| 5,523,608 A | 6/1996 | Kitaoka et al. | |
| 6,476,469 B2 | 11/2002 | Hung et al. | |
| 6,621,483 B2 | 9/2003 | Wallace et al. | |
| 6,677,929 B2 | 1/2004 | Gordon et al. | |
| 6,747,631 B1 * | 6/2004 | Sakamaki et al. | 345/157 |
| 6,785,061 B2 | 8/2004 | Smith | |
| 7,313,255 B2 | 12/2007 | Machida et al. | |
| 7,615,733 B2 * | 11/2009 | Koay et al. | 250/221 |
| 2006/0049492 A1 * | 3/2006 | Holloway et al. | 257/666 |
| 2007/0132733 A1 * | 6/2007 | Ram | 345/163 |

* cited by examiner

*Primary Examiner* — Kevin M Nguyen
*Assistant Examiner* — Sepideh Ghafari

(57) ABSTRACT

A system of a tactile switch and an optical navigation device. The system includes a user device. The user device includes an optical finger navigation device. The optical finger navigation device enables a user to control a function of the user device via the optical finger navigation device. The optical finger navigation device includes a circuit board, a sensor array electrically coupled to the circuit board, and a tactile switch electrically coupled to the circuit board. The sensor array detects light and generates a navigation signal that corresponds to the detected light. The tactile switch is physically aligned with the sensor array on the circuit board. The tactile switch generates a switch signal upon actuation of the tactile switch in response to a force on a packaging structure of the sensor array.

20 Claims, 9 Drawing Sheets

OPTICAL FINGER NAVIGATION DEVICE WITH INTEGRATED TACTILE SWITCH

BACKGROUND

Optical navigation devices use a light source to illuminate a navigation surface to provide digital images for computing motion. For example, a finger on a surface may be imaged to generate a navigation signal. Tactile switches may be implemented in conjunction with optical navigation devices. For example, an optical mouse may include one or more tactile switches such as a left click button and a right click button that allow a user to make a selection by clicking on the left and/or right click button. The conventional implementation of an optical navigation device and a tactile switch separates the operation of the optical navigation device from that of the tactile switch. For example, on the optical mouse, the optical navigation device is typically on the bottom of the optical mouse where the mouse is placed on a flat surface. As the mouse is moved, the optical navigation device tracks movement of the mouse relative to the flat surface. The tactile switch, on the other hand, is placed on the top and/or the side of the mouse. Hence, the operation of the optical navigation device occurs independent of the tactile switch, and vice versa.

However, as the size of navigation devices is reduced, the optical elements and sensors for detecting the optical navigation input are allotted less internal space for assembly and operation. For example, the inclusion of a user input interface on a modern cell phone and/or handheld computing device comes at a premium. Implementing a tactile switch in conjunction with an optical navigation device on a handheld computing device would include one space on the surface of the handheld computing device for the optical navigation device as well as another space on the surface of the handheld computing device for the tactile switch. Including two or more user input interfaces on the handheld computing device consumes valuable surface space on the handheld computing device that could be used to increase other functions of the handheld computing device including screen size, processing power, memory space, and/or battery capacity.

SUMMARY

Embodiments of a system are described. In one embodiment, the system includes a user device. The user device includes an optical finger navigation device. The optical finger navigation device enables a user to control a function of the user device via the optical finger navigation device. The optical finger navigation device includes a circuit board, a sensor array electrically coupled to the circuit board, and a tactile switch electrically coupled to the circuit board. The sensor array detects light and generates a navigation signal that corresponds to the detected light. The tactile switch is physically aligned with the sensor array on the circuit board. The tactile switch generates a switch signal upon actuation of the tactile switch in response to a force on a packaging structure of the sensor array. Other embodiments of the system are also described.

Embodiments of an apparatus are also described. In one embodiment, the apparatus includes a circuit board, a sensor array electrically coupled to the circuit board, and a tactile switch electrically coupled to the circuit board. The sensor array detects light and generates a navigation signal that corresponds to the detected light. The tactile switch is physically aligned with the sensor array on the circuit board. The tactile switch generates a switch signal upon actuation of the tactile switch in response to a force on a packaging structure of the sensor array. Other embodiments of the apparatus are also described. Embodiments of a method for making an optical finger navigation device are also described. In one embodiment, the method includes attaching a packaging structure of a sensor array to a circuit board to circumscribe a leadframe and to secure the leadframe to the circuit board. The method also includes placing the tactile switch on the circuit board, wherein the tactile switch is physically aligned with the sensor array, wherein the tactile switch is configured to actuate in response to a force on the packaging structure of the sensor array. Other embodiments of the method are also described.

Other embodiments will become apparent from the following detailed description, taken in conjunction with the accompanying drawings, illustrated by way of example.

BRIEF DESCRIPTION OF THE DRAWINGS

Throughout the description, similar reference numbers may be used to identify similar elements.

DETAILED DESCRIPTION

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

While many embodiments are described herein, at least some of the described embodiments facilitate aligning the placement of a tactile switch on a circuit board with an optical finger navigation (OFN) device. Aligning the placement of the tactile switch with the OFN device allows a user to actuate the tactile switch by pressing down on the OFN device. Some embodiments of the circuit board implement a flexible printed circuit board (FPCB). Implementing an FPCB allows the circuit board to flex when a user actuates the tactile switch by pressing down on the OFN device. Some embodiments of the FPCB implement a dual-sided FPCB. The dual-sided FPCB includes circuit connections on a top side of the FPCB and circuit connections on a bottom side of the FPCB. In an example implementation, a dual-sided FPCB allows the OFN device to be connected on the top side of one end of the FPCB and the tactile switch to be connected on the bottom side of the same end of the FPCB. Additionally, some of the embodiments described facilitate implementing a leadframe within a packaging structure as part of the structure of the OFN device. The leadframe includes a die-attach pad (DAP) to attach a semiconductor device, such as a sensor array and a light source of the OFN. Some embodiments of the packaging structure implement a structural crossbeam to add mechanical strength to the OFN device compared to a packaging structure without any crossbeam structure. Additionally, some embodiments of the leadframe implement at least two tie-bars between the leads and the DAP of the leadframe to add mechanical strength to the OFN device compared to a leadframe without any tie-bar. Adding mechanical strength and stiffness to the structure of the OFN device resists lateral sheer pressure on the OFN device when a user presses down on the OFN device to actuate the tactile switch.

Figure 1:
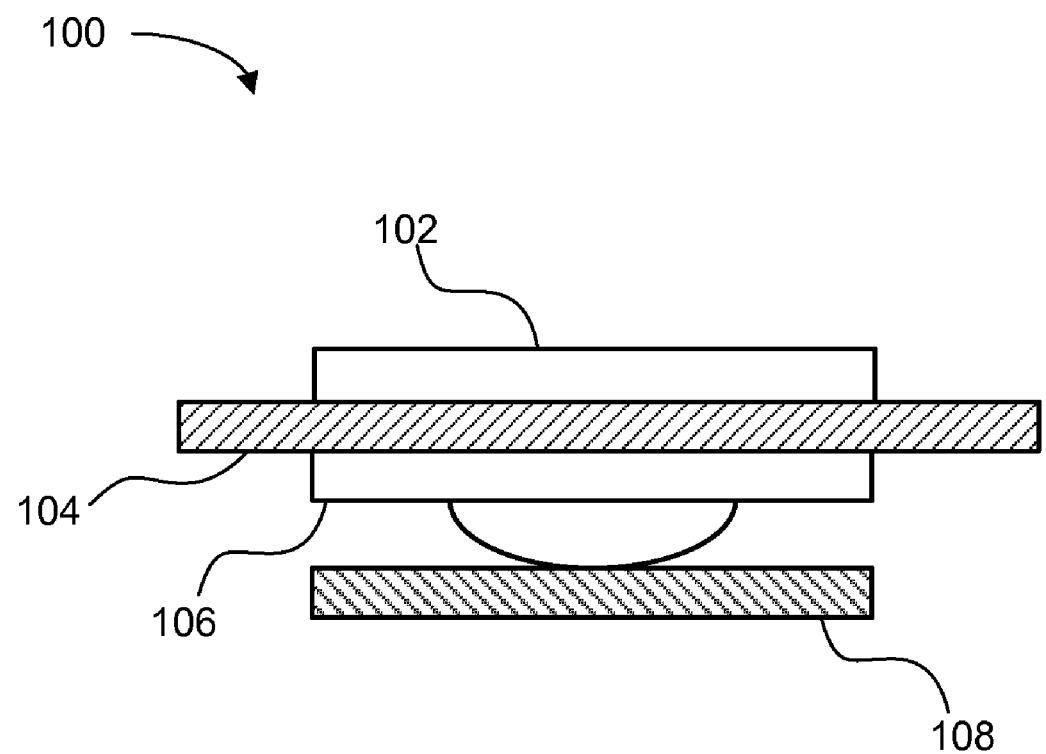
FIG. 1 depicts a schematic diagram of one embodiment of an optical finger navigation (OFN) device.

FIG. 1 depicts a schematic diagram of one embodiment of an optical finger navigation (OFN) device 100. As illustrated, the OFN device 100 includes an optical sensor 102, a circuit board 104, a tactile switch 106, and a surface 108. It should be noted that the configurations of the OFN device 100 are not limited to particular hardware or software implementations.

Although the depicted OFN device 100 is shown and described herein with certain components and functionality, other embodiments of the OFN device 100 may be implemented with fewer or more components or with more or less functionality. For example, in general, the optical sensor 102 may include a light source and a pixel array that captures frames of image data that are used for movement tracking. Additionally, some embodiments of the OFN device 100 include similar components arranged in another manner to provide similar functionality, in one or more aspects.

The illustrated circuit board 104, in one embodiment, is configured to provide a surface to which the optical sensor 102 may attach. In some embodiments, the circuit board 104 includes a printed circuit board (PCB). Alternatively, in some embodiments, the circuit board 104 includes a flexible PCB (FPCB). Compared to the PCB embodiment of the circuit board 104, the FPCB embodiment of the circuit board 104 is configured to provide a substantial increase in the amount of flex in response to a force on a packaging structure of the optical sensor 102. In some embodiments, the circuit board 104 is configured to include a dual-sided circuit board to allow a placement of a component and/or electrical connection on either side of the dual-sided circuit board.

In one embodiment, the optical sensor 102 is configured to attach to the circuit board 104. More specifically, the optical sensor 102 is configured to attach to a die-attach pad of a leadframe package. The optical sensor 102 is configured to track a movement of an object at a finger interface surface 124. In the depicted embodiment, the finger interface surface 124 is separated from the optical sensor 102 by a distance. In other embodiments, the finger interface surface may be closer to or farther away from the optical sensor 102. Additional details of embodiments of the finger interface surface 124 of the OFN device 100 is described below in further detail with reference to FIG. 3. In one embodiment, the optical sensor 102 is configured to detect light and to generate a navigation signal that corresponds to the detected light. In some embodiments, a wirebond (not shown) connects a contact pad (not shown) of the optical sensor 102 to a leadframe package. The leadframe package is described in further detail in relation to the optical sensor 102 below with reference to FIGS. 3, 4, 5A, and 5B.

In one embodiment, the tactile switch 106 physically aligns with the optical sensor 102 on the circuit board 104. In some embodiments, the tactile switch 106 is configured to detect a force on the leadframe package with the optical sensor 102.

As illustrated, in some embodiments, the tactile switch 106 includes a dome switch. When the tactile switch 106 is pressed against the surface 108, the tactile switch 106 generates a switch signal that corresponds to an actuation of the tactile switch 106 via the exertion of at least the certain force on the leadframe package.

Figure 2:
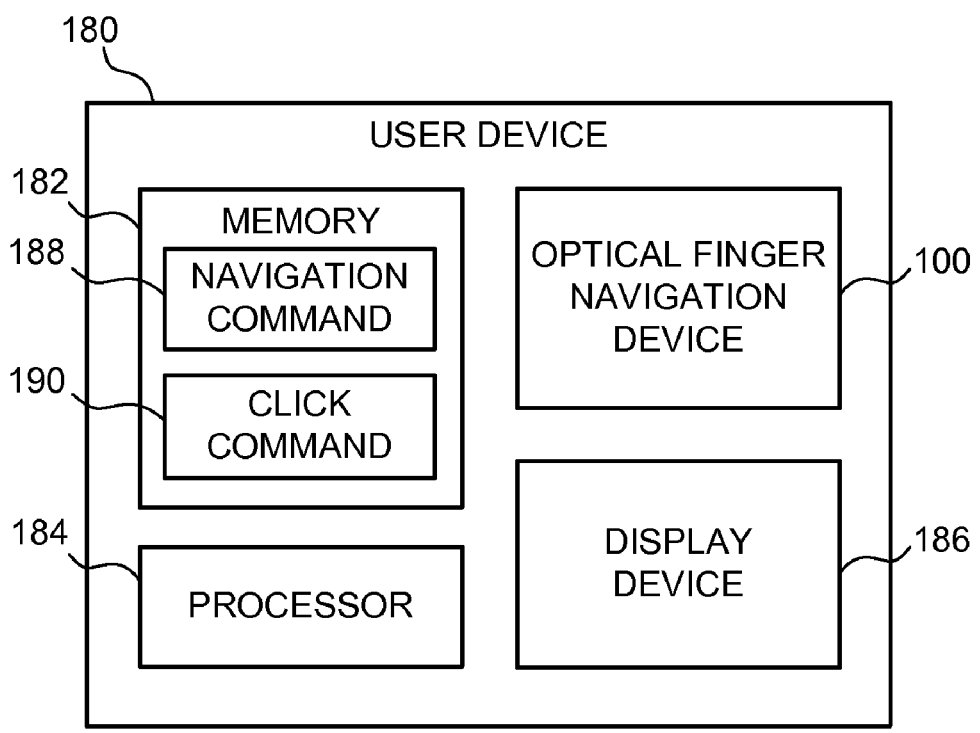
FIG. 2 depicts a schematic block diagram of one embodiment of a user device that incorporates the OFN device of FIG. 1.

FIG. 2 depicts a schematic block diagram of one embodiment of a user device 180 that incorporates the OFN device 100 of FIG. 1. As illustrated, the user device 180 includes a memory device 182, a processor 184, the OFN device 100 of FIG. 1, and a display device 186. It should be noted that the configurations of the user device 180 are not limited to particular hardware or software implementations. Although the depicted user device 180 is shown and described herein with certain components and functionality, other embodiments of the user device 180 may be implemented with fewer or more components or with more or less functionality. Additionally, some embodiments of the user device 180 include similar components arranged in another manner to provide similar functionality, in one or more aspects.

In one embodiment, the memory device 182 stores a navigation command 188 and a click command 190. In some embodiments, the navigation command 188 corresponds to a detected movement of an object on the finger interface surface 124 that is detected by the optical sensor 102 of the OFN device 100. In some embodiments, the click command 190 corresponds to an actuation of the tactile switch 106. In some embodiments, the processor 184 is configured to execute the navigation command 188 according to the navigation signal. As described above, the optical sensor 102 is configured to generate a navigation signal that corresponds to a detected light. In other words, the light source 120 illuminates the surface of an object placed on the finger interface surface 124. The optical sensor 102 then takes a certain number of image samples per second of the object that is placed on the finger interface surface 124 of the OFN device 100. Variations between successive image samples taken by the optical sensor 102 are processed to correlate to a movement of the object placed on the surface of the finger interface surface 124. A corresponding navigation response then occurs in an application of the user device 180 relative to the detected movement.

In one embodiment, the processor 184 is configured to execute the click command 190. As described above, the tactile switch 106 is configured to generate a switch signal that corresponds to an actuation of the tactile switch 106 via the exertion of at least a certain force on the cover 110 of the leadframe package 101 (refer to FIG. 3) and/or the finger interface surface 124 of the OFN device 100. In other words, an object on the finger interface surface 124 applies a certain force to the finger interface surface 124. The certain force to the finger interface surface 124 presses the tactile switch 106 against the surface 108. The mechanical compression of the tactile switch 106 against the surface 108 actuates the tactile switch 106.

In one embodiment, the display device 186 is configured to display a click function relative to the actuation of the tactile switch 106 via the exertion of at least the certain force on the finger interface surface 124 of the OFN device 100. In some embodiments, the display device 186 is configured to display a navigation function relative to the detection of movement of an object placed on the surface of the finger interface surface 124 of the OFN device 100 by the optical sensor 102.

Figure 3:
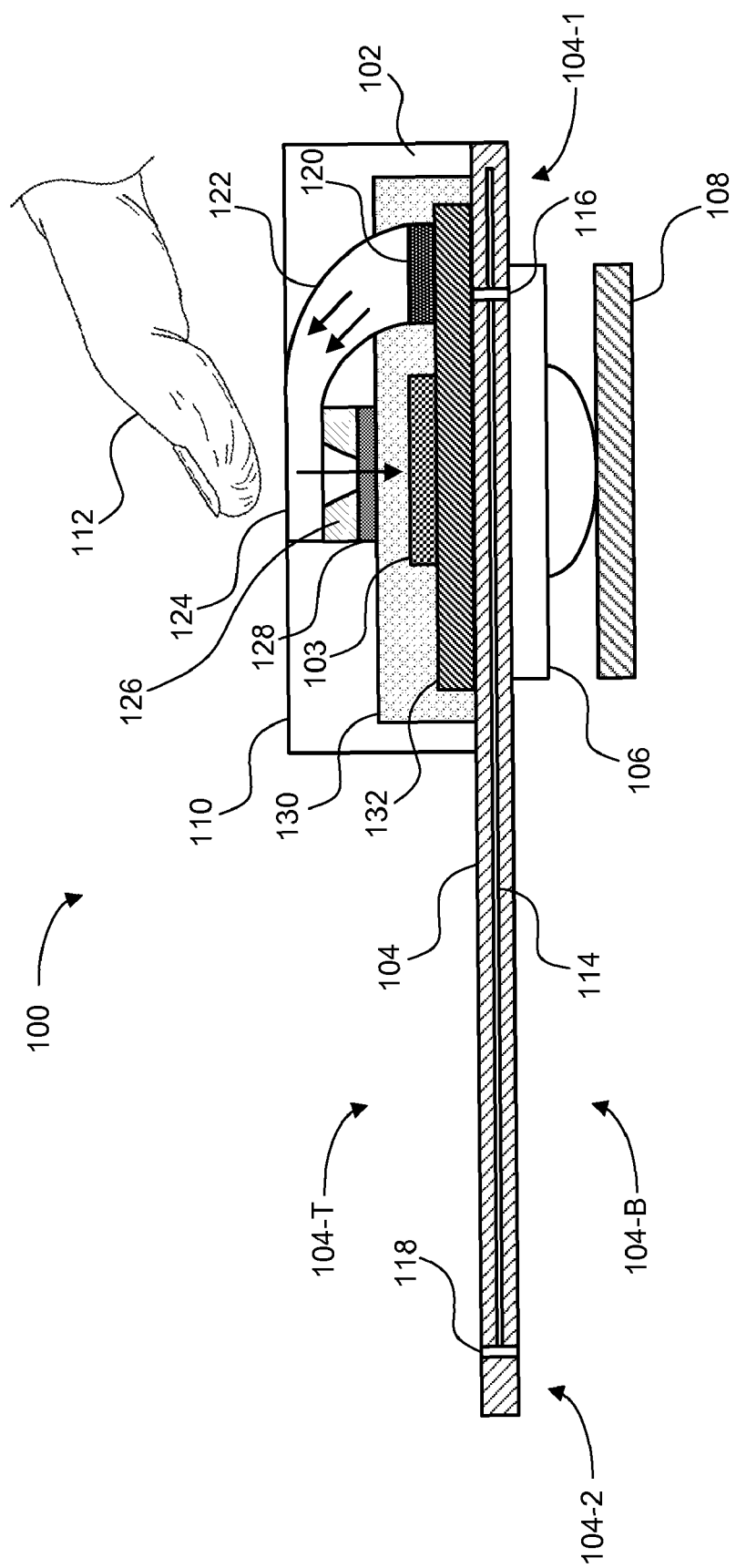
FIG. 3 depicts a schematic diagram of another embodiment of the OFN device.

FIG. 3 depicts a schematic diagram of another embodiment of the OFN device 100. As illustrated, the OFN device 100 includes the optical sensor 102, a circuit board 104, an optical sensor cover 110, the tactile switch 106, and the surface 108. A finger 112 of a user is also shown relative to the OFN device 100. As depicted, the circuit board 104 includes a first end 104-1 and a second end 104-2 of the circuit board 104. Additionally, some embodiments of the circuit board 104 include a trace 114. The trace 114, in some embodiments, includes a first via connection 116 and a second via connection 118. Additionally, as depicted the optical sensor cover 110 is configured to enclose a leadframe package 101, or a leadframe 132 enclosed in a packaging structure 130. As illustrated, the optical sensor 102 includes a sensor array 103, a light source 120, an optical element 122, and a finger interface surface 124. Additionally, some embodiments of the optical sensor 102 include an aperture 126 and/or a lens 128. It should be noted that the configurations of the OFN device 100 are not limited to particular hardware implementations.

Although the depicted OFN device 100 is shown and described herein with certain components and functionality, other embodiments of the OFN device 100 may be implemented with fewer or more components or with more or less functionality. Additionally, some embodiments of the OFN device 100 include similar components arranged in another manner to provide similar functionality, in one or more aspects.

The illustrated circuit board 104, in one embodiment, is configured to provide a surface to which the leadframe package 101 may attach. Additionally, the circuit board 104 is configured to flex in response to a force on the cover 110 and/or finger interface surface 124 of the OFN device 100 in order to actuate the tactile switch 106. The electrical connection is configured to allow the flow of electrical signals over, through, and within the circuit board 104. In some embodiments, the circuit board 104 includes a printed circuit board (PCB). Alternatively, in some embodiments, the circuit board 104 includes a flexible PCB (FPCB). Compared to the PCB embodiment of the circuit board 104, the FPCB embodiment of the circuit board 104 is configured to provide a substantial increase in the amount of flex in response to a force on the cover 110 and/or finger interface surface 124 in order to actuate the tactile switch 106. In some embodiments, the circuit board 104 is configured to include a dual-sided circuit board to allow the placement of a component and/or electrical connection on either side of the dual-sided circuit board. The dual-sided embodiment of the circuit board 104 includes a top surface of the circuit board 104-T and a bottom surface of the circuit board 104-B. Additionally, in some embodiments, the circuit board 104 is configured to include a dual-ended circuit board to allow the placement of a component and/or electrical connection on either end of the dual-ended circuit board.

As illustrated in FIG. 3, the trace 114 runs throughout the length of the circuit board 104 to electrically connect the first end of the circuit board 104-1 to the second end of the circuit board 104-2. Additionally, the trace 114 includes at least one first via connection 116 on the first end of the circuit board 104-1 and at least one second via connection 118 at the second end of the circuit board 104-2. In one embodiment, the first via connection 116 is configured to electrically connect the leadframe package 101 to the circuit board 104. In some embodiments, the first via connection 116 is configured to electrically connect the tactile switch 106 to the circuit board 104. Furthermore, the first via connection 116 is configured to electrically connect the leadframe package 101 to the tactile switch 106. As depicted, in some embodiments, the leadframe package 101 attaches to the first end 104-1 and the top surface 104-T of the circuit board 104. Additionally, in some embodiments, the tactile switch 106 attaches to the first end 104-1 and the bottom surface 104-B of the circuit board 104. In some embodiments, the leadframe package 101 is physically aligned with the tactile switch 106 on the circuit board 104 such that an exertion of a certain force on the cover 110 and/or finger interface surface 124 actuates the tactile switch 106. Additionally, the second via connection 118 is configured to provide a peripheral connection to allow the attachment of a user device to the second end of the circuit board 104-2. In other words, in an example embodiment, the OFN device 100 may be attached to a hardware and/or electrical connection within a cell phone to provide a hardware-based user navigation interface to allow a user to control one or more functions and/or operations of the cell phone. Alternatively, in some embodiments, the user device, the leadframe package 101, and/or the tactile switch 106 attach to the same end of the circuit board 104.

In one embodiment, the leadframe package 101 includes at least one component attached to the packaging structure 130 and/or the leadframe 132. In some embodiments, the leadframe package 101 is configured to secure the light source 120, the optical element 122, the finger interface surface 124, the aperture 126, the lens 128, and/or the sensor array 103 to the OFN device 100. As mentioned above, the cover 110 is configured to enclose and/or seal the leadframe package 101 on the circuit board 104. In some embodiments, a light source 120 is configured to attach to the leadframe package 101. The light source 120 is configured to generate a light to illuminate the finger 112 on the finger interface surface 124. The optical element 122 is configured to attach to the leadframe package 101 to guide light from the light source 120. Some embodiments of the optical element 122 include a finger interface surface 124. The optical element 122 is configured to guide the light from the light source 120 to the finger interface surface 124. The finger interface surface 124 is configured to shine a portion of the light from the light source 120 on an object placed over and within a certain proximity to the finger interface surface 124. As depicted, a user places his or her finger 112 over the finger interface surface 124.

In one embodiment, the aperture 126 is configured to physically align with the finger interface surface 124. In some embodiments, the aperture 126 is configured to allow a portion of the light to pass through the aperture 126. As depicted, the aperture 126 passes through a portion of the light from the light source 120 that reflects off the finger 112. In some embodiments, the lens is configured to focus the light on the sensor array 103.

In one embodiment, the sensor array 103 is configured to attach to the leadframe package 101. More specifically, the sensor array 103 is configured to attach to a die-attach pad. The sensor array 103 is configured to track a movement of the finger 112 relative to the finger interface surface 124. More specifically, the sensor array 103 is configured to detect light and to generate a navigation signal that corresponds to the detected light. In some embodiments, a wirebond (not shown) connects a lead of the leadframe package 101 to a contact pad (not shown) of the sensor array 103.

In one embodiment, the tactile switch 106 physically aligns with the sensor array 103 on the circuit board 104. In generally, the tactile switch 106 and the sensor array 103 may be physically aligned in any orientation in which pressure on the sensor array 103 actuates the tactile switch 106. In a more specific embodiment, the sensor array 103 may be aligned to be partially or wholly above the tactile switch 106. More specifically, in some embodiments, the center of the sensor array 103 is approximately vertically aligned with the center of the tactile switch 106. In this way, a downward pressure on the sensor array 103 directly actuates, for example, a dome switch or another actuator which implements the tactile switch 106. In some embodiments, the tactile switch 106 is configured to detect an exertion of at least a certain force, either directly or indirectly, on the cover 110 of the leadframe package 101 and/or finger interface surface 124 which presses the tactile switch 106 against the surface 108 and subsequently actuates the tactile switch 106. As illustrated, in some embodiments, the tactile switch 106 includes a dome switch. When the tactile switch 106 is pressed against the surface 108, the tactile switch 106 generates a switch signal that corresponds to an actuation of the tactile switch 106 via the exertion of at least the certain force on the cover 110 of the leadframe package 101 and/or finger interface surface 124. For example, when the tactile switch 106 such as a dome switch is pressed against the surface 108, the dome switch collapses. The collapse of the dome switch then generates the switch signal. As explained above, in some embodiments, the sensor array 103 is configured to attach to the top surface of the circuit board 104-T and the tactile switch is further configured to attach to the bottom surface of the circuit board 104-B. The first via connection 116, in some embodiments, electrically connects the tactile switch 106 and the leadframe package 101 to each other and/or to the circuit board 104.

In one embodiment, the sensor array 103 includes an array of distinct photodetectors (not shown), for example, a 16×16 or 32×32 array of distinct photodetectors configured to detect light that is reflected from the illuminated spot on the navigation surface. Each of the photodetectors in the sensor array 103 generates light intensity information that is output as a digital value (e.g., an 8-bit digital value). Image information is captured by the sensor array 103 in frames, where a frame of image information includes a set of simultaneously captured values for each distinct photodetector in the sensor array 103. The rate of image frame capture and tracking resolution can be programmable. In an embodiment, the image frame capture rate ranges up to 2,300 frames per second with a resolution of 800 counts per inch (cpi). Although some examples of frame capture rates and resolutions are provided, different frame capture rates and resolutions are contemplated.

A tracking engine (not shown) compares successive image frames from the sensor array 103 to determine the movement of image features between frames. In particular, the tracking engine determines movement by correlating common features that exist in successive image frames from the sensor array 103. The movement between image frames is expressed in terms of movement vectors in, for example, X and Y directions (e.g., ΔX and ΔY). The movement vectors are then used to determine the movement of the OFN device 100 relative to the navigation surface. More detailed descriptions of examples of navigation sensor movement tracking techniques are provided in U.S. Pat. No. 5,644,139, entitled NAVIGATION TECHNIQUE FOR DETECTING MOVEMENT OF NAVIGATION SENSORS RELATIVE TO AN OBJECT, and U.S. Pat. No. 6,222,174, entitled METHOD OF CORRELATING IMMEDIATELY ACQUIRED AND PREVIOUSLY STORED FEATURE INFORMATION FOR MOTION SENSING, both of which are incorporated by reference herein.

Figure 4:
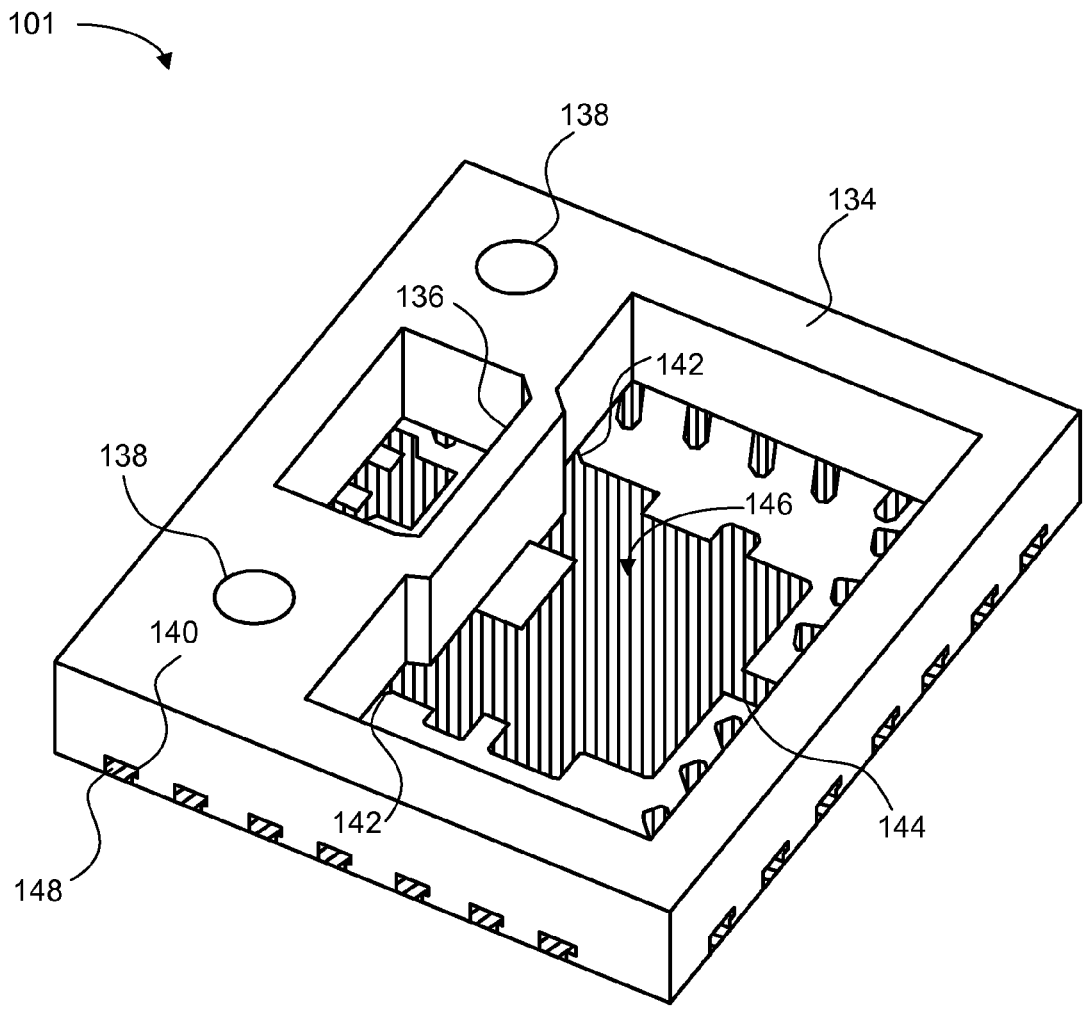
FIG. 4 depicts a schematic diagram of one embodiment of a leadframe package.

FIG. 4 depicts a schematic diagram of one embodiment of the leadframe package 101. Some embodiments of the leadframe package 101 include the leadframe 132 of FIGS. 2A and 2B circumscribed within the packaging structure 130 of FIG. 6. As illustrated in FIG. 4, the leadframe package 101 includes the crossbeam 136, mounting holes 138, the leadframe socket 140, and the corner tie-bars 142. Additionally, the leadframe package 101 includes the side tie-bar 144, the die-attach pad 146, and the lead 148. It should be noted that the configurations of leadframe package 101 are not limited to particular hardware implementations.

Although the depicted package of the packaging structure 130 and the leadframe 132 is shown and described herein with certain components and functionality, other embodiments of leadframe package 101 may be implemented with fewer or more components or with more or less functionality. For example, some embodiments of leadframe package 101 include a plurality of leadframe sockets 140 and leads 148. Additionally, some embodiments of leadframe package 101 include similar components arranged in another manner to provide similar functionality, in one or more aspects.

In one embodiment, the compound walls 134 of the leadframe package 101 are configured to circumscribe the leadframe 132 and to secure the leadframe 132 to the packaging structure 130. In particular, in some embodiments, the leadframe socket 140 of the leadframe package 101 anchors the leads 148 of the leadframe 132 to the packaging structure 130. As depicted, the die-attach pad 146 is accessible between the compound walls 134 of the leadframe package 101. In some embodiments, the sensor array 103 attaches to the top surface of the die-attach pad 146, or the side of the die-attach pad 146 that can be seen in FIG. 4. The tactile switch 106 attaches to the bottom surface of the circuit board 104 under the die-attach pad 146. Hence, the tactile switch 106 is physically aligned with the sensor array 103. The crossbeam 136 is configured to resist lateral sheer pressure on the leadframe package 101 in response to pressure that is applied to leadframe package 101 to actuate the tactile switch on the bottom of leadframe package 101. In one embodiment, the mounting holes 138 allow the leadframe package 101 to be mounted to the surface of a substrate such as a circuit board.

Figure 5A:
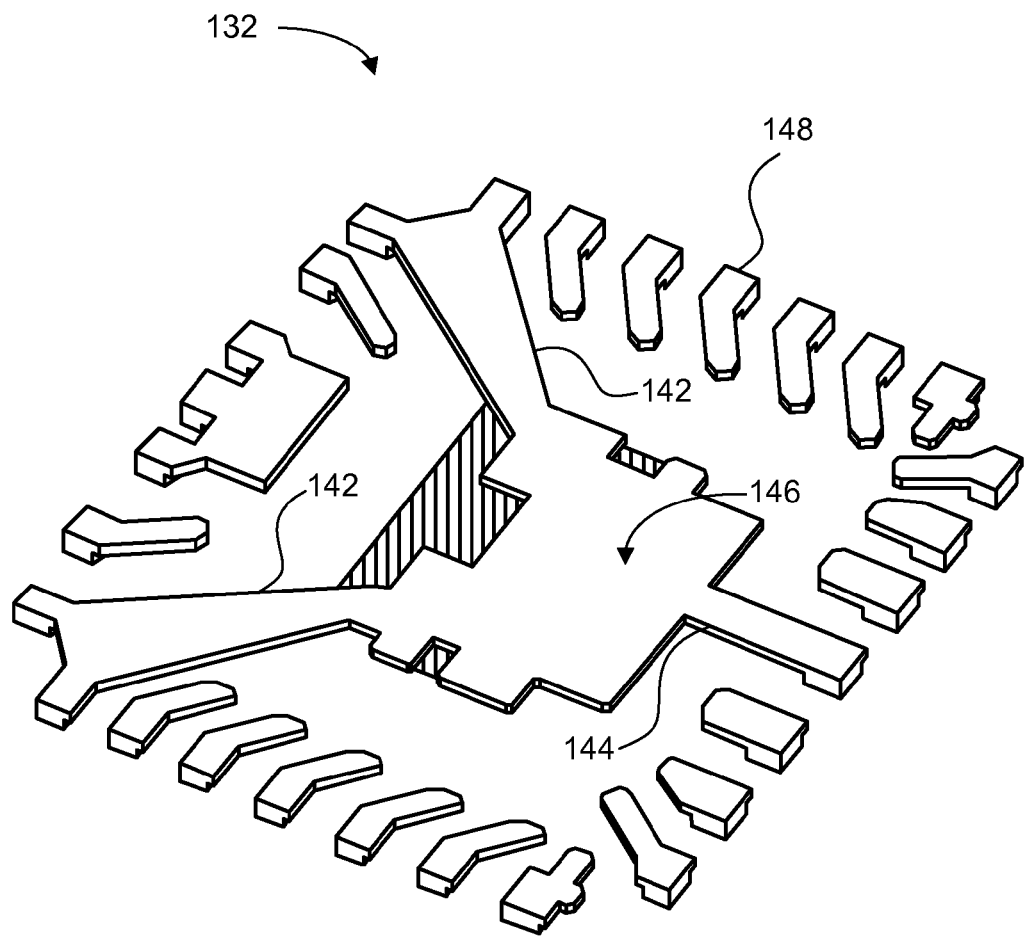
FIG. 5A depicts a schematic diagram of one embodiment of a top surface of a leadframe.

FIG. 5A depicts a schematic diagram of one embodiment of a top surface of a leadframe 132. The depicted top surface of the leadframe 132 includes corner tie-bars 142, a side tie-bar 144, a die-attach pad 146, and a top surface of the leads 148. It should be noted that the configurations of the corner tie-bar 142, the side tie-bar 144, the die-attach pad 146, and the leads 148 are not limited to particular hardware implementations. In one embodiment, at least a portion of the top surface of the leadframe 132 is formed from a chemical etch process. Alternatively, in some embodiments, at least a portion of the top surface of the leadframe 132 is formed from a stamp process.

Although the depicted top surface of the leadframe 132 is shown and described herein with certain components and functionality, other embodiments of the top surface of the leadframe 132 may be implemented with fewer or more components or with more or less functionality. For example, some embodiments of the top surface of the leadframe 132 may include a plurality of corner tie-bars 142, side tie-bars 144, die-attach pads 146, and leads 148.

As illustrated, the leadframe 132 includes two corner tie-bars 142 and one side tie-bar 144. It should be noted that some embodiments of the leadframe 132 may include less or more corner tie-bars 142 and/or side tie-bars 144. As depicted, the tie-bars 142 and 144 include a metal extension of the die-attach pad 146 to one or more leads 148 of the leadframe 132. In other words, the tie-bars 142 and 144 physically and/or electrically connect the die-attach pad 146 to one or more leads 148 of the leadframe 132. In one embodiment, the tie-bars 142 and 144 are configured to resist lateral sheer pressure on the leadframe 132 in response to an exertion of at least a certain force on an optical finger navigation apparatus that attaches to the die-attach pad 146.

In one embodiment, the corner tie-bar 142 connects the die-attach pad 146 to two of the leads 148 of the leadframe 132. As depicted, the corner tie-bar 142 extends diagonally from the die-attach pad 146 and is configured to connect two corner leads 148 of the leadframe 132 to the die-attach pad 146. Alternatively, the corner tie-bar 142 connects the die-attach pad 146 to one lead 148 of the leadframe 132. Furthermore, in some embodiments, the corner tie-bar 142 connects three or more leads 148 of the leadframe 132 to the die-attach pad 146.

As depicted, the side tie-bar 144 connects the die-attach pad 146 to two of the leads 148 of the leadframe 132. More specifically, the side tie-bar 144 extends from one side of the die-attach pad 146 to connect a middle lead 148 of the leadframe 132 to the die-attach pad 146. Alternatively, the side tie-bar 144 connects the die-attach pad 146 to two or more leads 148 of the leadframe 132.

In one embodiment, the die-attach pad 146 is configured to attach a semi-conductive device to the leadframe 132. More specifically, the die-attach pad 146 is configured to attach the sensor array 103 to the die-attach pad 146. In some embodiments, an adhesive (not shown) placed on the die-attach pad 146 is configured to attach the sensor array 103 to the die-attach pad. Alternatively, in some embodiments, a fastener (not shown) is configured to attach the sensor array 103 to the die-attach pad 146.

In one embodiment, the leads 148 are configured to electrically connect to a contact pad (not shown) of the sensor array 103 that attaches to the die-attach pad 146. More specifically, in some embodiments, a wirebond (not shown) is configured to electrically connect a trace of a circuit board to the leads 148 and/or a contact pad of the sensor array 103 that attaches to the die-attach pad 146.

Figure 5B:
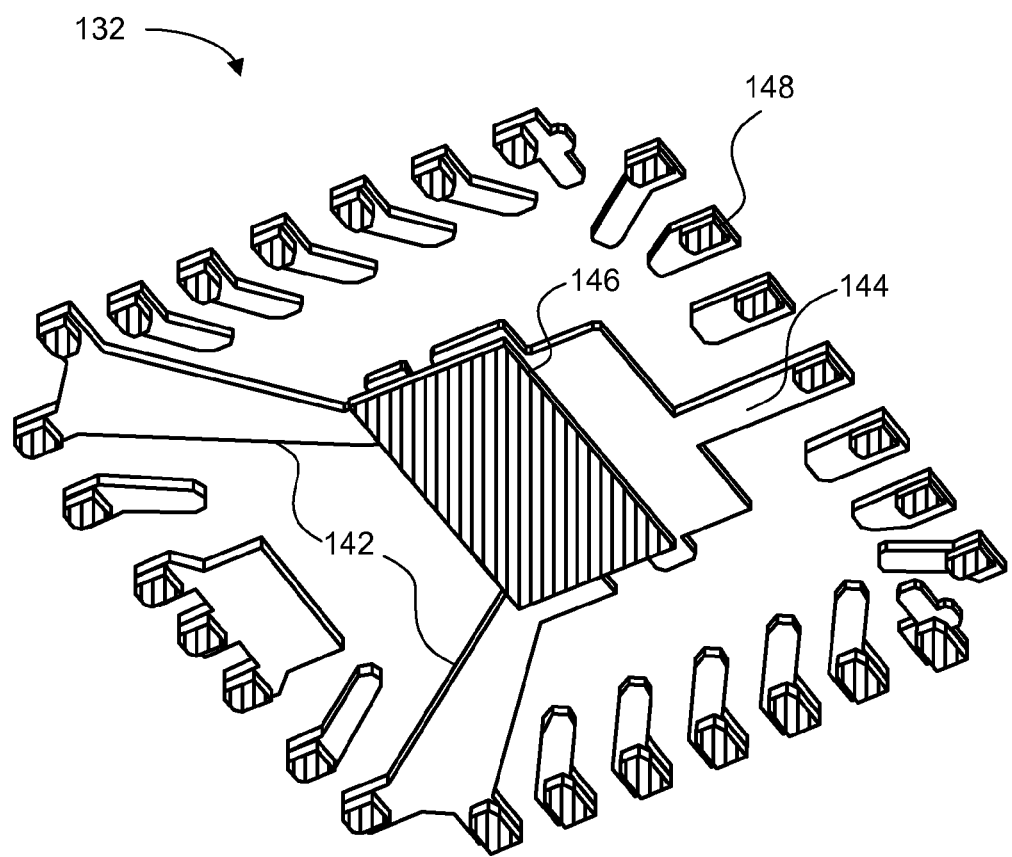
FIG. 5B depicts a schematic diagram of one embodiment of a bottom surface of the leadframe of FIG. 5A.

FIG. 5B depicts a schematic diagram of one embodiment of a bottom surface of the leadframe 132 of FIG. 5A. As depicted, the bottom surface of the leadframe 132 includes a bottom surface of the leads 148 and a bottom surface of the die-attach pad 146. Furthermore, FIG. 5B depicts the underside of the top surface of the die-attach pad 146, as well as the underside of the tie-bars 142 and 144. It should be noted that the configurations of the bottom surface of the leads 148 and the bottom surface of the die-attach pad 146 are not limited to particular hardware implementations. Although the depicted bottom surface of the leadframe 132 is shown and described herein with certain features and functionality, other embodiments of the leadframe 132 may be implemented with fewer or more features or with more or less functionality. In one embodiment, at least a portion of the bottom surface of the leadframe 132 is formed from a chemical etch process. Alternatively, in some embodiments, at least a portion of the bottom surface of the leadframe 132 is formed from a stamp process.

In one embodiment, the bottom surface of the leads 148 is configured to secure the leads 148 in the leadframe socket 140 of the packaging structure 130. Additionally, in some embodiments, the bottom surface of the leads 148 is configured to increase the conductivity of the leads 148. Furthermore, in some embodiments, the bottom surface of the leads 148 is configured to increase the heat dissipation ability of the leads 148.

In one embodiment, the bottom surface of the die-attach pad 146 is configured to secure the die-attach pad 146 to the packaging structure 130. Additionally, in some embodiments, the bottom surface of the die-attach pad 146 is configured to increase the conductivity of the die-attach pad 146. Furthermore, in some embodiments, the bottom surface of the die-attach pad 146 is configured to increase the heat dissipation ability of the die-attach pad 146.

Figure 6:
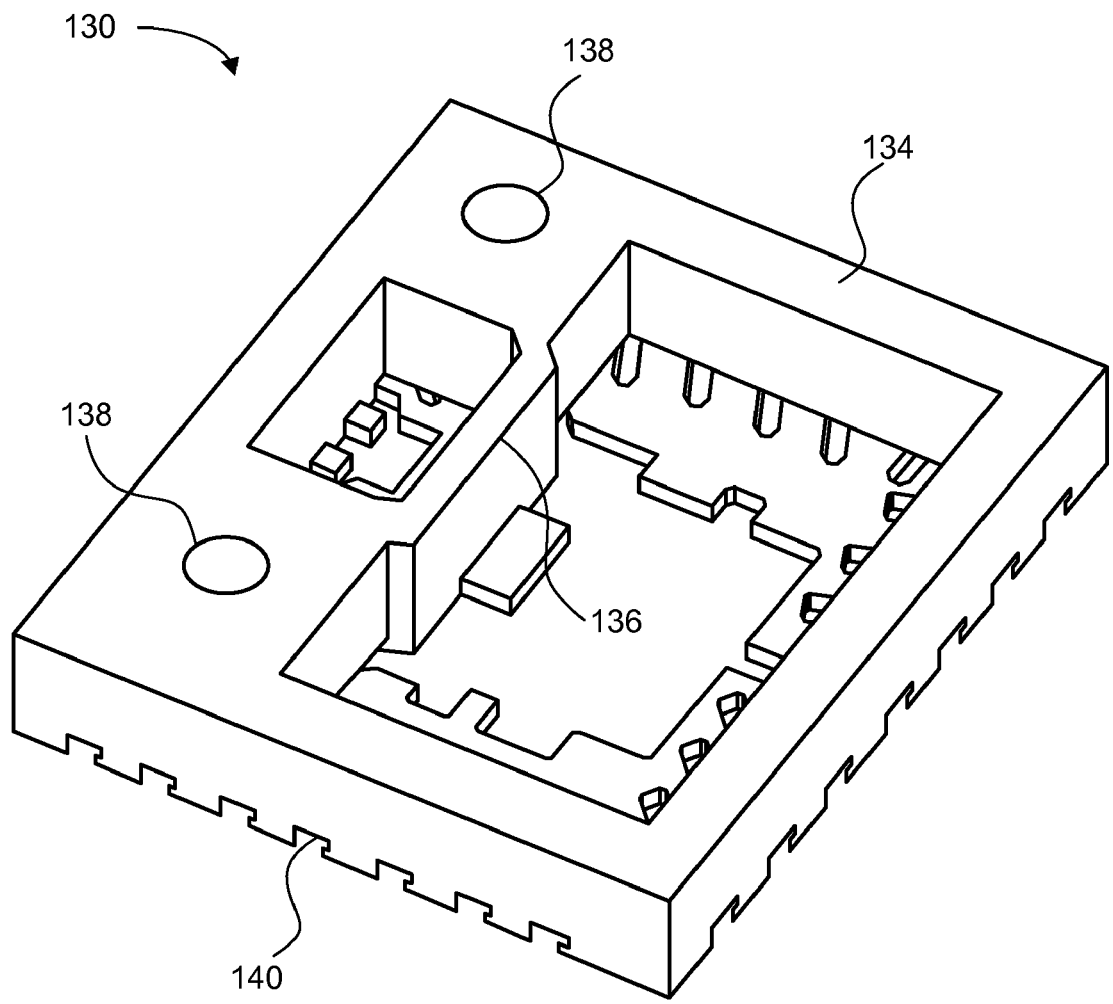
FIG. 6 depicts a schematic diagram of one embodiment of a packaging structure.

FIG. 6 depicts a schematic diagram of one embodiment of a packaging structure 130. As depicted, the packaging structure 130 includes a compound wall 134, a crossbeam 136, mounting holes 138, and a leadframe socket 140. It should be noted that the configurations of the compound wall 134, the crossbeam 136, the mounting holes 138, and the leadframe socket 140 are not limited to particular hardware implementations.

Although the depicted packaging structure 130 is shown and described herein with certain features and functionality, other embodiments of the packaging structure 130 may be implemented with fewer or more features or with more or less functionality. For example, some embodiments of the packaging structure 130 include a plurality of compound walls 134, crossbeams 136, mounting holes 138, and/or leadframe sockets 140. Additionally, some embodiments of the packaging structure 130 include similar components arranged in another manner to provide similar functionality, in one or more aspects.

In some embodiments, the packaging structure 130 is at least partially formed from plastics. In some embodiments, the packaging structure 130 is at least partially formed from ceramics. As depicted, the packaging structure 130 includes four compound walls 134. The four compound walls are configured to circumscribe a leadframe and to secure the leadframe to the packaging structure 130.

As illustrated, the four compound walls 134 form a square. In other words, the shape of the packaging structure 130 is a square. It should be noted that other shapes and configurations of the compound walls 134 are possible. For example, six compound walls 134 may be configured to form a hexagonal shaped packaging structure 130. In one embodiment, the crossbeam 136, as depicted, is configured to secure one of the compound walls 134 of the square packaging structure 130 to an opposite compound wall 134 of the square packaging structure 130. In other words, as depicted, the crossbeam 136 runs parallel to at least two of the compound walls 134. Additionally, as illustrated, the crossbeam 136 runs orthogonal to at least of the two compound walls 134. Alternatively, the crossbeam 136 may be configured to secure one of the compound walls 134 of the square packaging structure 130 to an adjacent compound wall 134 of the packaging structure 130. In other words, the crossbeam 136 may run diagonal, or at some angle other than 90 degrees, to at least one of the compound walls 134. Furthermore, in some embodiments, the crossbeam 136 may be configured to secure at least one corner of the packaging structure 130 to at least one other corner of the packaging structure 130. In other words, in an example embodiment of the packaging structure 130, the crossbeam runs diagonally from one corner of the depicted square packaging structure 130 to the opposite corner of the packaging structure 130.

In one embodiment, as depicted, the packaging structure 130 includes a plurality of leadframe sockets 140. In one embodiment, the packaging structure 130 is molded to enclose the leadframe 132 and to secure the leadframe 132 within the packaging structure 130. As illustrated in FIG. 6, the leadframe sockets 140 are configured to secure at least a portion of the leadframe 132 to the packaging structure 130. More specifically, the leadframe sockets 140 anchor the leads 148 of the leadframe 132 to the packaging structure 130.

Figure 7:
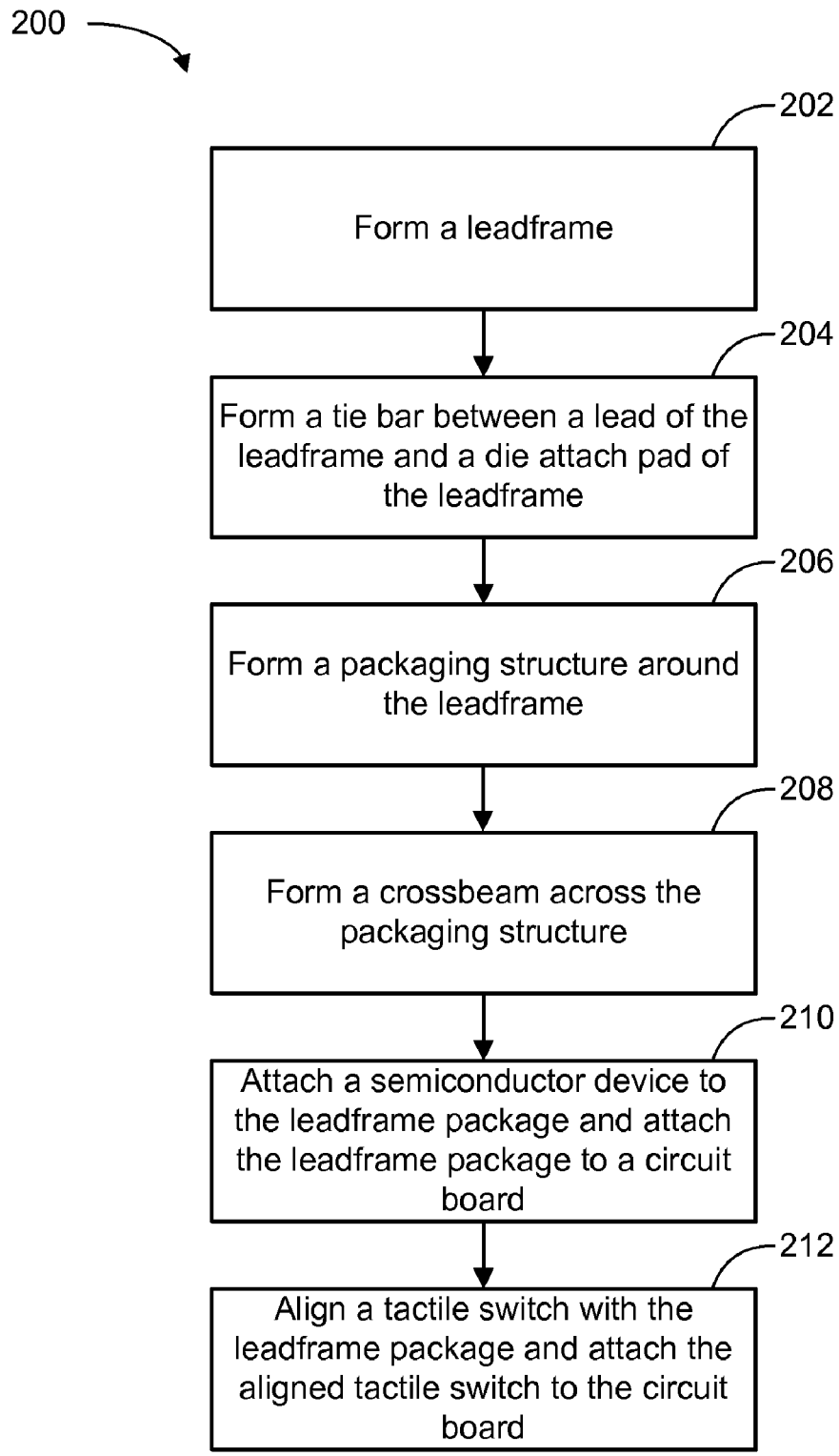
FIG. 7 depicts a flow chart diagram showing one embodiment of a method for forming the OFN device of FIG. 3.

FIG. 7 depicts a flow chart diagram showing one embodiment of a method 200 for forming the OFN device 100 of FIG. 3. Although the method 200 is described in conjunction with the OFN device 100 of FIG. 3 and components thereof, other embodiments of the method 200 may be implemented with other OFN devices and/or other components thereof.

As illustrated, at block 202, a leadframe such as the leadframe 132 of FIGS. 5A and 5B is formed. As described above, the leadframe 132 includes the leads 148 and the die-attach pad 146. In some embodiments, the leadframe structure is formed using known processes. At block 204, a tie-bar such as the corner tie-bar 142 and/or the side tie-bar 144 of FIGS. 5A and 5B is formed between a lead of the leadframe and a die attach pad of the leadframe. In some embodiments, the corner tie-bar is formed at the same time and/or using the same processes as the leadframe structure. At block 206, a packaging structure is formed around the leadframe such as the packaging structure 130 of FIG. 6 packaged around the leadframe 132 of FIGS. 5A and 5B. At block 208, a crossbeam is formed across the packaging structure such as the crossbeam 136 of the packaging structure 130 of FIG. 6. In some embodiments, the crossbeam 136 is formed at the same time and/or by the same process as the leadframe structure described above.

In one embodiment, at block 210, a semiconductor device is attached to the leadframe packaging structure and the leadframe package is attached to a circuit board. For example, in some embodiments, the sensor array 103 and/or the light source 120 attach to the die-attach pad 146 as part of the leadframe package 101, and the leadframe package 101 attaches to the circuit board 104, as depicted in FIG. 3. At block 212, a tactile switch 106 is aligned with the leadframe package 130 and attaches the aligned tactile switch 106 to the circuit board 104. For example, in some embodiments, the leadframe package 101 is attached to one side of the circuit board 104 and the tactile switch 106 is attached to the other side of the circuit board 104 opposite of the leadframe package 101 such that the tactile switch 106 is aligned with the leadframe package 101.

Figure 8:
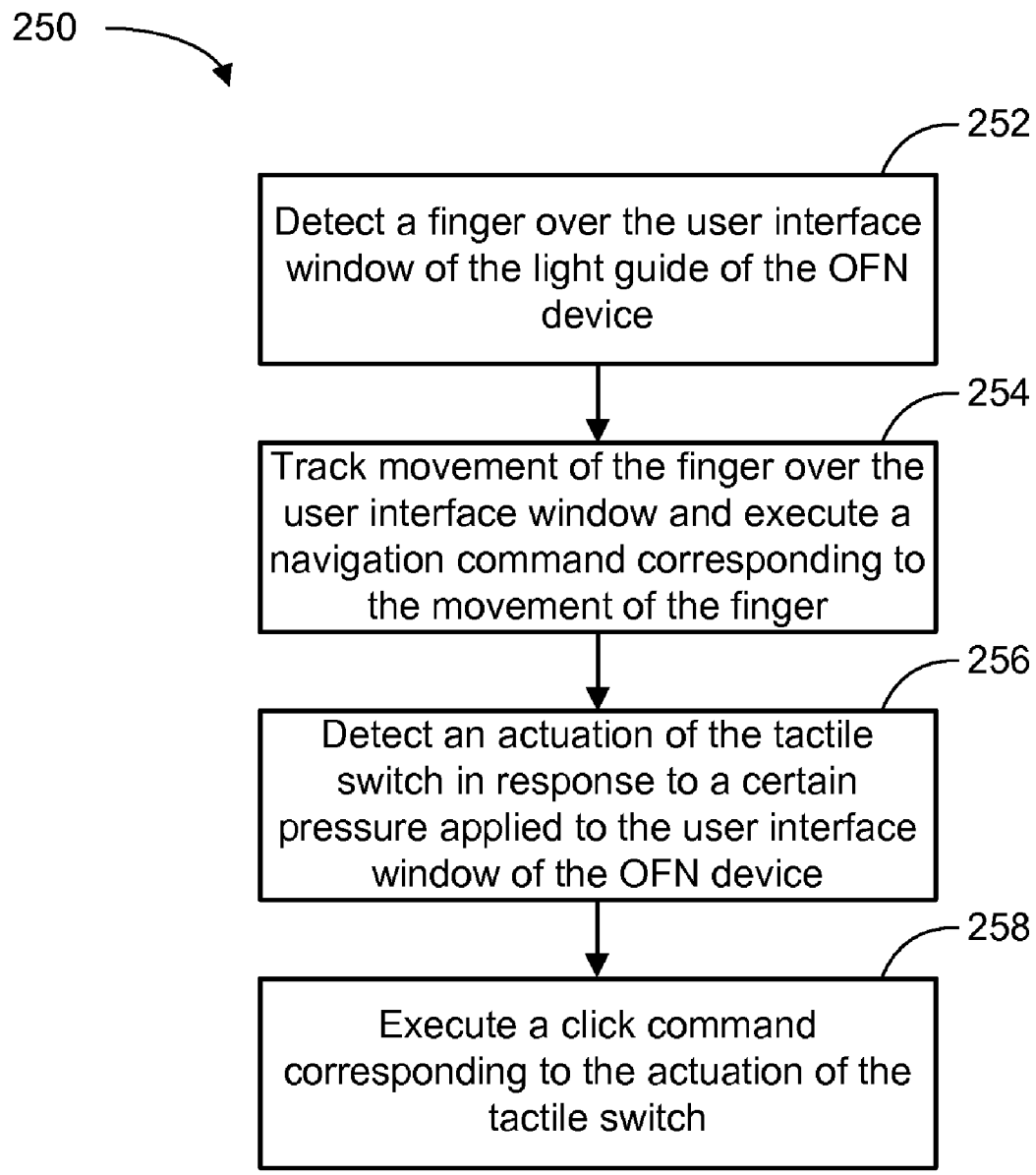
FIG. 8 depicts a flow chart diagram showing one embodiment of a method for operating the OFN device of FIG. 3.

FIG. 8 depicts a flow chart diagram showing one embodiment of a method 250 for operating the OFN device 100 of FIG. 3. Although the method 250 is described in conjunction with the OFN device 100 of FIG. 3 and components thereof, other embodiments of the method 250 may be implemented with other OFN devices and/or other components thereof.

As illustrated, at block 252, the sensor array 103 detects the finger 112 over the finger interface surface 124 of the optical element 122 of the OFN device 100. At block 254, the sensor array 103 is configured to track movement of the finger 112 over the finger interface surface 124 and the processor 184 executes a navigation command 188 corresponding to the movement of the finger 112. At block 256, the processor 184 detects an actuation of the tactile switch 106 in response to a certain force applied to the finger interface surface 124 of the OFN device 100. At block 258, the processor 184 executes a click command 190 corresponding to the actuation of the tactile switch 106.

Other embodiments of the methods 200 and 250 may implement fewer or more operations. At least some of the operations for the methods 200 and 250, and the OFN device 100 may be implemented using software instructions stored on a computer useable storage medium for execution by a computer. As an example, an embodiment of a computer program product includes logic encoded in one or more tangible media for execution and when executed, causes the computer to perform operations, as described above.

Embodiments of the invention can take the form of an entirely hardware embodiment or an embodiment containing both hardware and software elements. In one embodiment, the invention is partially implemented in software, which includes but is not limited to firmware, resident software, microcode, etc.

The computer-useable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), a digital video disk (DVD), and high-definition (HD) disks such as Blu-Ray and HD-DVD.

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical finger navigation apparatus, the apparatus comprising: a circuit board; a sensor array electrically coupled to the circuit board, the sensor array to detect light and to generate a navigation signal that corresponds to the detected light; and a tactile switch electrically coupled to the circuit board and physically aligned with the sensor array, the tactile switch to generate a switch signal upon actuation of the tactile switch in response to a force on a packaging structure of the sensor array.

2. The apparatus of claim 1, wherein the circuit board comprises a dual-sided circuit board to allow component placement on both sides of the dual-sided circuit board, wherein the dual-sided circuit board comprises a top surface and a bottom surface, wherein the sensor array is coupled to the top surface of the circuit board and the tactile switch is coupled to the bottom surface of the circuit board.

3. The apparatus of claim 2, wherein the circuit board comprises a flexible printed circuit board (FPCB).

4. The apparatus of claim 1, wherein the circuit board comprises electrical leads to connect the sensor array and the tactile switch to a user device.

5. The apparatus of claim 1, further comprising a leadframe electrically coupled to the sensor array, wherein the leadframe comprises: a die-attach pad to attach the sensor array to the leadframe; a plurality of leads to interconnect a plurality of contact pads of the sensor array to the leadframe; and a tie-bar coupled to the die-attach pad and at least one of the plurality of leads, wherein the tie-bar comprises a metal extension configured to resist lateral sheer pressure on the leadframe in response to the force on the packaging structure of the sensor array.

6. The apparatus of claim 5, wherein the leadframe further comprises multiple tie-bars, wherein at least one of the multiple tie-bars is configured to attach to the corner of the die-attach pad to tie together the die-attach pad and at least two of the plurality of leads from multiple sides of the leadframe, and wherein at least one other of the multiple tie-bars is configured to attach to the side of the die-attach pad to tie together the die-attach pad and at least one of the plurality of leads from one side of the leadframe.

7. The apparatus of claim 5, wherein the packaging structure comprises: a plurality of compound walls to circumscribe the leadframe and to secure the leadframe to the packaging structure; and a crossbeam to attach at least one of the plurality of compound walls of the packaging structure to at least one other of the plurality of compound walls of the packaging structure.

8. The apparatus of claim 5, further comprising: a light source electrically coupled to the leadframe, the light source to generate the light; an optical element optically coupled to the light source, wherein the optical element comprises a finger interface surface, the optical element to guide the light from the light source to the finger interface surface, wherein the sensor array is further configured to track a movement of a finger at the finger interface surface.

9. A system comprising: a user device, wherein the user device comprises an optical finger navigation device, the optical finger navigation device to enable a user to control a function of the user device via the optical finger navigation device, wherein the optical finger navigation device comprises: a circuit board; a sensor array electrically coupled to the circuit board, the sensor array to detect light and to generate a navigation signal that corresponds to the detected light; and a tactile switch electrically coupled to the circuit board and physically aligned with the sensor array, the tactile switch to generate a switch signal upon actuation of the tactile switch in response to a force on a packaging structure of the sensor array.

10. The system of claim 9, wherein the optical finger navigation device further comprises: a leadframe, wherein the leadframe comprises at least one tie-bar connected to at least one of a plurality of leads of the leadframe, wherein the at least one tie-bar comprises a metal extension to connect the at least one of the plurality of leads to a die-attach pad, wherein the tie-bar is configured to resist lateral sheer pressure on the leadframe in response to the force on the packaging structure of the sensor array; a light source electrically coupled to the leadframe, the light source to generate a light; and an optical element coupled to the light source, wherein the optical element comprises a finger interface surface, the optical element to guide the light from the light source to the finger interface surface, wherein the sensor array is further configured to track a movement of a finger on the finger interface surface.

11. The system of claim 10, wherein the optical finger navigation device further comprises: a plurality of compound walls of a packaging structure, the plurality of compound walls to circumscribe the leadframe and to secure the leadframe to the packaging structure; and a crossbeam to attach at least one of the plurality of compound walls of the packaging structure to at least one other of the plurality of compound walls of the packaging structure.

12. The system of claim 9, further comprising: a memory device coupled to the optical finger navigation device, the memory device to store a navigation command; and a processor coupled to the memory device, wherein the processor is configured to execute the navigation command according to the navigation signal.

13. The system of claim 12, wherein the memory device is further configured to store a click command, wherein the processor is further configured to execute the click command according to the switch signal.

14. The system of claim 13, further comprising a display device coupled to the processor, the display device to display a click function relative to the actuation of the tactile switch.

15. A method for making an optical finger navigation device, the method comprising: attaching a packaging structure of a sensor array to a circuit board to circumscribe a leadframe and to secure the leadframe to the circuit board; and placing a tactile switch on the circuit board, wherein the tactile switch is physically aligned with the sensor array, wherein the tactile switch is configured to actuate in response to a force on the packaging structure of the sensor array.

16. The method of claim 15, further comprising: attaching the packaging structure of the sensor array to a top surface of the circuit board; and attaching the tactile switch to a bottom surface of the circuit board.

17. The method of claim 15, further comprising: extending an electrical connection between a first end of the circuit board and a second end of the circuit board; attaching the packaging structure of the sensor array and the tactile switch to the first end of the circuit board;

and attaching a user device to the second end of the circuit board.

18. The method of claim 15, further comprising: interconnecting a plurality of contact pads of the sensor array to a plurality of leads of the leadframe; attaching the sensor array to a die-attach pad of the leadframe; attaching a light source to the leadframe; placing an optical element above the light source, wherein the optical element comprises a finger interface surface;

physically aligning the finger interface surface with the sensor array; and connecting at least one of the plurality of leads to the die-attach pad via a tie-bar, wherein the tie-bar comprises an extension of metal to tie the at least one lead to the die-attach pad, wherein the tie-bar is configured to resist lateral sheer pressure on the leadframe in response to the force on the packaging structure of the sensor array.

19. The method of claim 18, further comprising: adding multiple tie-bars to the leadframe; attaching at least one of the multiple tie-bars to the corner of the die-attach pad to tie together the die-attach pad and at least two of the plurality of leads from multiple sides of the leadframe; and attaching at least one other of the multiple tie-bars to the side of the die-attach pad to tie together the die-attach pad and at least one of the plurality of leads from one side of the leadframe.

20. The method of claim 15, further comprising: attaching a crossbeam between at least one of a plurality of compound walls of the packaging structure and at least one other of the plurality of compound walls of the packaging structure; and attaching a lid on the packaging structure.

\* \* \* \* \*